United States Patent
Hegranes et al.

(10) Patent No.: US 10,971,023 B2
(45) Date of Patent: Apr. 6, 2021

(54) SYSTEMS AND METHODS FOR MULTI-CHANNEL REMOTE IDENTIFICATION OF AIRCRAFT

(71) Applicant: Kittyhawk.io, Inc., San Francisco, CA (US)

(72) Inventors: Jonathan Hegranes, San Francisco, CA (US); Andrew Elefant, San Francisco, CA (US); Michael Curry, San Francisco, CA (US); Joshua Ziering, San Francisco, CA (US)

(73) Assignee: Kittyhawk.io, Inc., San Francisco, CA (US)

( * ) Notice: Subject to any disclaimer, the term of this patent is extended or adjusted under 35 U.S.C. 154(b) by 263 days.

(21) Appl. No.: 16/363,883

(22) Filed: Mar. 25, 2019

(65) Prior Publication Data

US 2020/0312165 A1    Oct. 1, 2020

(51) Int. Cl.
*G08G 5/00*   (2006.01)
*G01S 13/91*  (2006.01)
*G06K 9/00*   (2006.01)

(52) U.S. Cl.
CPC .......... *G08G 5/0082* (2013.01); *G01S 13/91* (2013.01); *G06K 9/0063* (2013.01); *G08G 5/0026* (2013.01)

(58) Field of Classification Search
CPC .... G08G 5/0082; G08G 5/0026; G01S 13/91; G01S 13/862; G01S 13/86; G01S 13/867; G06K 9/0063
See application file for complete search history.

(56) References Cited

U.S. PATENT DOCUMENTS

| | | | | |
|---|---|---|---|---|
| 3,691,559 | A * | 9/1972 | Jackson | G01S 11/08 342/458 |
| 5,596,332 | A * | 1/1997 | Coles | G01S 5/0009 342/455 |
| 9,742,441 | B2 * | 8/2017 | Whitaker | H04B 1/28 |
| 2018/0352443 | A1 * | 12/2018 | Hwang | H04W 16/26 |
| 2018/0375568 | A1 * | 12/2018 | De Rosa | H04W 72/04 |
| 2019/0244528 | A1 * | 8/2019 | Srinivasan | G08G 5/0021 |
| 2020/0287619 | A1 * | 9/2020 | Tavner | G05D 1/0022 |

* cited by examiner

*Primary Examiner* — Mary Cheung
(74) *Attorney, Agent, or Firm* — Ansari Katiraei LLP; Armin Katiraei; Sadiq Ansari

(57) ABSTRACT

An aircraft detection system identifies aircraft based on identifying information obtained from two or more different detection channels using a distributed set of user equipment, network equipment, broadcast receivers, aircraft control cloud system, and/or flight tracking equipment with different sensors. The different sensors may detect aircraft that communicate via different wireless networks, network connectivity, message broadcasts, visual features, and sound in addition to or instead traditional radar and satellite detection. Accordingly, the aircraft detection system may perform multi-channel remote identification to accelerate the identification of aircraft and may use the two or more detection channels as alternate means with which to identify aircraft that may go undetected with one or more of the detection channels.

20 Claims, 9 Drawing Sheets

SYSTEMS AND METHODS FOR MULTI-CHANNEL REMOTE IDENTIFICATION OF AIRCRAFT

BACKGROUND INFORMATION

Airspace is becoming more populated with the proliferation of drones and other aircraft, and with expanded uses of these aircraft for recreational, delivery, personal transportation, and/or other services. Some of these flights may not be monitored or tracked by local municipalities, air control towers, regulatory agencies (e.g., the Federal Aviation Administration), or others because existing radar technology cannot detect the aircraft or because the aircraft are currently not subject to tracking or regulation.

As such, there is the potential for conflicted airspace. Different operators may fly aircraft in the same region of airspace without knowledge of the other flights that could disrupt the operations or flight plan of one or more operators, result in damage to the aircraft or injury to property or people, or create other situations that could have been avoided had the aircraft been identified and tracked during flight.

DETAILED DESCRIPTION OF PREFERRED EMBODIMENTS

Figure 1:
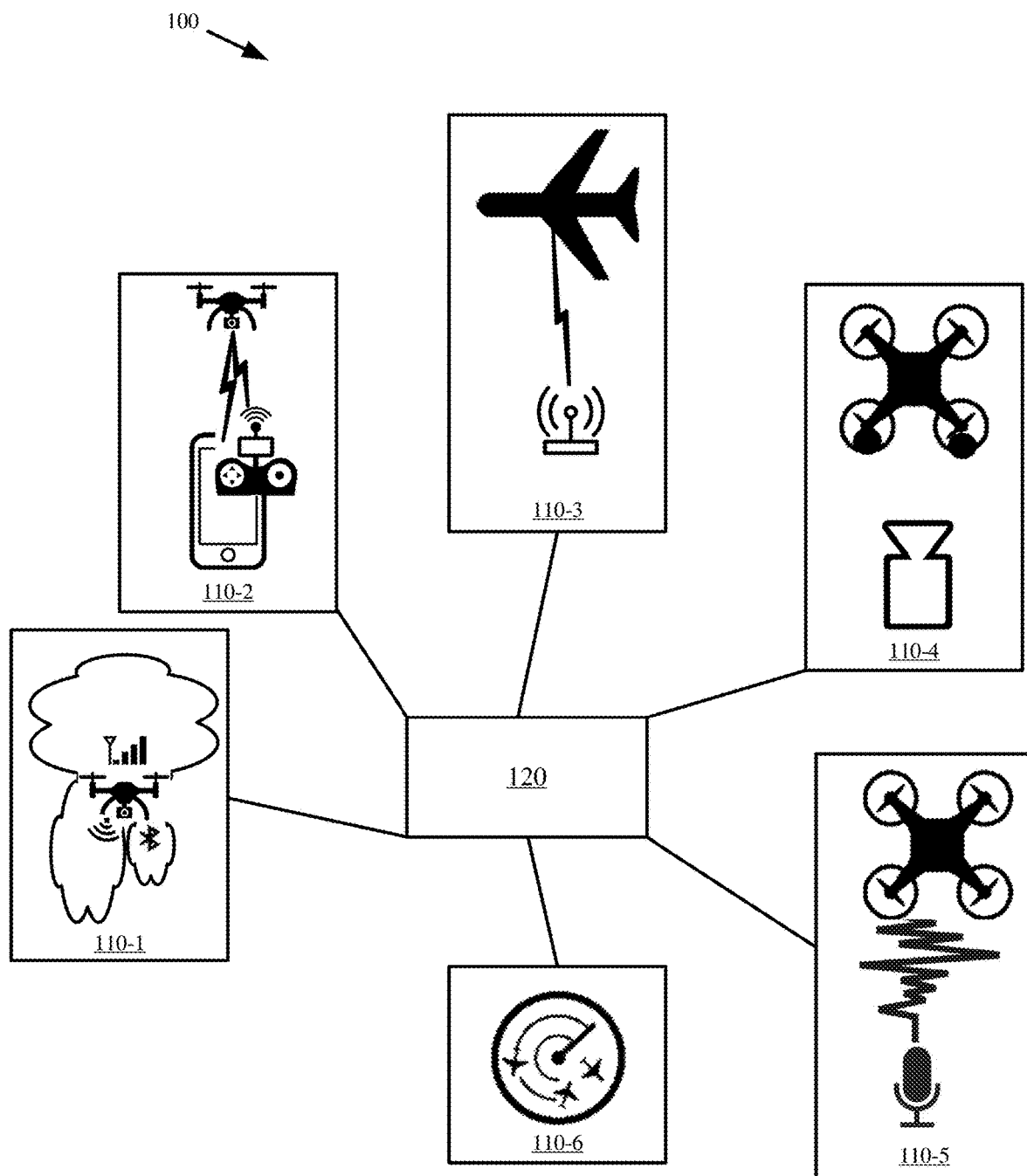
FIG. 1 illustrates an example of an aircraft detection system identifying different aircraft via different detection channels in accordance with some embodiments presented herein.

The following detailed description refers to the accompanying drawings. The same reference numbers in different drawings may identify the same or similar elements.

Systems and methods, as described herein, provide an aircraft detection system that performs multi-channel remote identification of aircraft. In particular, the aircraft detection system may use two or more different detection channels to identify different aircraft (during flight or upon activation) regardless of whether the aircraft use different forms of self-identification or do not self-identify during flight or upon activation.

The different detection channels may supplement, enhance, and/or replace traditional radar-based identification of aircraft. For instance, each detection channel may use different networks, connectivity, broadcasts, visual, acoustic, and/or other means to identify aircraft. In some embodiments, the multi-channel remote identification may use a distributed set of devices and sensors, ranging from specialized air tracking equipment to user equipment, to form the different detection channels.

By virtue of using the different detection channels, the aircraft detection system may identify and/or track aircraft that may otherwise be undetectable by traditional radar systems or other systems that rely on a single detection channel. In other words, the aircraft detection system may perform the multi-channel remote identification and may use the two or more detection channels as alternate means with which to identify aircraft that may go undetected with one or more of the detection channels. Accordingly, the aircraft detection system may adapt to different types of aircraft, and may provide a comprehensive solution for identifying and tracking commercial aircraft as well as smaller aircraft or aircraft flying at lower altitudes, such as drones or other Unmanned Aerial Vehicles ("UAVs").

In some embodiments, the aircraft detection system may perform the multi-channel remote identification in order to accelerate aircraft identification. More specifically, the aircraft detection system may perform the multi-channel remote identification in order to identify aircraft via whichever of the two or more detection channels is able to detect aircraft fastest. Accordingly, the multi-channel remote identification may identify aircraft faster than traditional systems that use a single detection channel.

The multi-channel remote identification may include identifying aircraft that is activated or flying in a given airspace, obtaining different identifying information about the identified aircraft, and obtaining and/or tracking a position of the identified aircraft via the one or more detection channels. Different aircraft identifying information may be obtained from the different detection channels. At the very least, each detection channel is used to identify the presence of aircraft in a relative area.

The aircraft detection system may assign a unique identifier to each identified aircraft, and may associate the identifier to the relative position of the corresponding identified aircraft. In some embodiments, the identifier may provide additional identifying information about the identified aircraft. For instance, the identifier may identify the category, class, and/or type of the identified aircraft as well as provide other information about the aircraft, aircraft operator, or flight. In some embodiments, the additional identifying information may be linked to or accessed from the identifier.

The aircraft detection system may aggregate information about aircraft identified from the different detection channels and their relative positioning to form a real-time accounting of different aircraft operating in different airspace. Users, regulating agencies, and/or others may access the aircraft detection system in order to determine airspace activity, create flight plans, and/or adjust existing flight plans based on the identification of other aircraft operating in the same airspace.

FIG. 1 illustrates an example of aircraft detection system 100 identifying different aircraft via different detection channels in accordance with some embodiments presented herein. As shown in FIG. 1, aircraft detection system 100 may include six detection channels 110-1, 110-2, 110-3, 110-4, 110-5, and 110-6 (herein sometimes collectively referred to as "detection channels 110" or individually as "detection channel 110") from which aircraft detection device 120 may detect different aircraft. In some other embodiments, aircraft detection device 120 may use more, less, or different detection channels 110 to detect aircraft.

First detection channel 110-1 may include different short-range wireless networks, long-range wireless networks, radio frequencies, and/or other characteristics of wireless signaling used by different aircraft to communicate. In some embodiments, the multi-channel remote identification via first detection channel 110-1 may include identifying aircraft based on the wireless networks, radio frequencies, and/or other signaling that are generated by the aircraft in order to communicate with a remote controller, device, or other system.

Aircraft detection device 120 may identify aircraft via first detection channel 110-1 by connecting and/or communicating with one or more devices or sensors that are in wireless network range or radio frequency range of different aircraft and that detect the signaling and/or messaging for or from the aircraft over the different wireless networks or radio frequencies. In some embodiments, the multi-channel remote identification via first detection channel 110-1 may include using one or more devices or sensors that are within the messaging path of the one or more networks used by aircraft to communicate with other devices. The devices or sensors in the network path may identify aircraft based on messaging for or from the aircraft passing over the one or more networks, and may provide aircraft identifying information to aircraft detection device 120 based on the messaging. For instance, aircraft detection device 120 may obtain access to anonymized data packets that pass through a telecommunications network and that are directed to a particular port, Internet Protocol ("IP") address, domain name, or other identifier associated with remote controlled aircraft. Examples of some networks by which to identify aircraft via first detection channel 110-1 include different WiFi networks, different Bluetooth networks, proprietary networks operating in 2.4 gigahertz ("GHZ"), 5.8 GHZ, and/or other frequencies, cellular networks, and/or other Wide Area Networks ("WANs").

Positioning of aircraft identified via first detection channel 110-1 may be determined relative to the position of the device or sensor that detects the wireless network, radio frequencies, and/or signaling used to communicate with the aircraft. For example, a device may detect a WiFi network created by a particular drone, and the device may provide its positioning along with identifying information about the aircraft to aircraft detection device 120. Aircraft detection device 120 may track movements of the aircraft in airspace based on changes to the signal strength between the detecting device and the aircraft. For instance, the signal strength for the WiFi network created by the particular drone decreases as the particular drone flies further away from the detecting device, and increases as the particular drone flies closer to the detecting device.

Positioning of aircraft identified via first detection channel 110-1 may also be determined via signal triangulation or a network point of origin. For instance, aircraft, that communicate via a cellular network, may connect to the network via a particular Radio Access Network ("RAN"). The relative positioning of the aircraft may therefore be determined by identifying the location of the RAN from which data packets sent by the aircraft originate. Aircraft detection device 120 may track movements of the aircraft by tracking the location of the different RANs that the aircraft uses to access the network. Similarly, the relative positioning of the aircraft may be determined based on the IP address that is assigned to the aircraft by a network, and geolocating that IP address to a specific RAN or geographic region.

Second detection channel 110-2 may include devices that control different aircraft, and that relay or provide data about the controlled aircraft to aircraft detection device 120. In some embodiments, second detection channel 110-2 may include devices that communicate with the aircraft over a first network (e.g., a WiFi or Bluetooth network) or first radio frequency, and that relay data about the connected aircraft to aircraft detection device 120 over a different second network (e.g., a WAN) or different second radio frequency. For instance, the devices may run an application that provides aircraft and/or flight information to aircraft detection system 100, or that uses aircraft detection system 100 for other services in exchange for sharing the aircraft and/or flight information.

Aircraft detection device 120 may determine relative positioning of aircraft identified via second detection channel 110-2 based on positioning of the device that controls the aircraft when the device is geographically proximate to the aircraft (e.g., a remote controller that uses WiFi, Bluetooth, or other wireless connectivity to control the aircraft), and when the device has a geolocation or geopositioning sensor. Aircraft detection device 120 may alternatively determine positioning of aircraft identified via second detection channel 110-2 based on flight tracking information the device provides for the controlled aircraft. For instance, the aircraft may have its own geolocation or geopositioning sensor, may provide the positioning data to the controller, and the controller may relay the positioning data to aircraft detection device 120. The flight tracking information further enables aircraft detection device 120 to accurately track movements of the aircraft across different airspace.

Third detection channel 110-3 may include devices or sensors that receive broadcast messaging from different aircraft, and that provide aircraft identification information to aircraft detection device 120 based on the received broadcast messaging. In some embodiments, the multi-channel remote identification via third detection channel 110-3 may include connecting to and/or communicating with air traffic control ground stations, radios, and/or other devices that are turned to receive messages that are periodically broadcast by aircraft during flight. The aircraft may broadcast the messages without establishing connections to the broadcast message receiving devices. The messages may be broadcast according to defined formats and/or defined frequencies.

Aircraft detection device 120 may obtain positioning of aircraft identified via third detection channel 110-3 when the broadcast messaging includes the location of the aircraft. For example, the identified aircraft may issue Automatic Dependent Surveillance-Broadcast ("ADS-B") messages, and each message may include the position of the aircraft as determined from satellite navigation and/or other systems. Aircraft detection device 120 may obtain a feed of the ADS-B message in order to determine the position of the aircraft and further track flight. Alternatively, aircraft detection device 120 may determine a relative position of the identified aircraft based on the position of the device or sensor that receives the broadcast message from the identified aircraft. Aircraft detection device 120 may track flight of the aircraft based on the position of different devices or sensors that receive the broadcast messages from the same aircraft.

Fourth detection channel 110-4 may identify aircraft based on sight. In some embodiments, the multi-channel remote identification via fourth detection channel 110-1 may include using one or more devices or sensors that are within visible range of different aircraft to identify visual features of the aircraft, and to provide aircraft identifying information to aircraft detection device 120 based on the identified visual features. In some embodiments, the devices or sensors may include cameras or other imaging sensors to take images of the aircraft, monitor flight patterns, capture emitted light from the aircraft, and/or other visual features of the aircraft. The devices, sensors, or aircraft detection device 120 may be able to differentiate between different aircraft based on one or more of these visual features. For instance, aircraft detection device 120 may identify different aircraft based on one or more lights flashing in different patterns, different sequences, with different colors, with different intensities, for different durations, and/or other characteristics. The lights can be used to encode messages that provide aircraft identifying information and/or positional information. For instance, one or more lights can be flashed in a manner that produces a binary-encoded message for identifying any of the make, model, type, or other information about the aircraft.

Fifth detection channel 110-5 may identify aircraft based on sound. In some embodiments, the multi-channel remote identification via fifth detection channel 110-5 may include using one or more devices or sensors that are within audible range of the aircraft to capture a sound signature of the aircraft in flight, and to provide aircraft identifying information to aircraft detection device 120 based on the captured sound signature. For instance, aircraft detection device 120 may differentiate between different aircraft based on the frequency, loudness, pitch, tone, and/or other acoustic characteristic of the sound generated by different aircraft during flight. The aircraft may also use speakers to emit sound at specific frequencies, and may encode various messages based on the frequency, amplitude, pulse, intensity, and/or other characteristics of the sound.

Aircraft detection device 120 may determine relative positioning of aircraft identified via fourth detection channel 110-4 or fifth detection channel 110-5 based on positioning data of the device or sensor that obtained the images or sound signature of the aircraft. In some embodiments, aircraft detection device 120 may further track the movements of the aircraft based on changing appearance of the aircraft visual features or changing sound of the aircraft relative to the position of the device or sensor used to capture the visual feature or sound. For instance, the aircraft position may be tracked via time-of-flight measurements obtained from the emitted light or sound from the aircraft.

Sixth detection channel 110-6 may correspond to radar-based or satellite-based aircraft identification. In some embodiments, the multi-channel remote identification via sixth detection channel 110-6 may include accessing air traffic control systems, ground-based radars, or flight tracking satellites in order to obtain identifying information about aircraft tracked via radar and/or satellite. Sixth detection channel 110-6 may therefore represent an existing detection channel by which commercial aircraft are tracked. Sixth detection channel 110-6 may be unable to detect smaller aircraft (e.g., drones, UAV, etc.) or aircraft flying in different classes of airspace. However, by integrating the other detection channels 110 as part of aircraft detection system 100, airspace detection system 100 may be able to identify and track different types of aircraft in different airspace.

In some embodiments, aircraft detection system 100 may use additional or other detection channels to identify different aircraft in different airspace. For instance, aircraft detection system 100 may integrate with a distributed set of devices or sensors that detect Radio Frequency Identifiers ("RFIDs") transmitted by aircraft when activated or during flight, or that detect aircraft messaging transmitted over other unlicensed communication channels or unlicensed spectrum.

Aircraft detection device 120 may aggregate information from different detection channels 110 in order to provide a comprehensive accounting of identified aircraft and their relative positioning in different airspace. In some embodiments, aircraft detection device 120 may assign an identifier to identify each aircraft detected via one or more of detection channels 110, and may map the identifier to a corresponding position of the identified aircraft.

Figure 2:
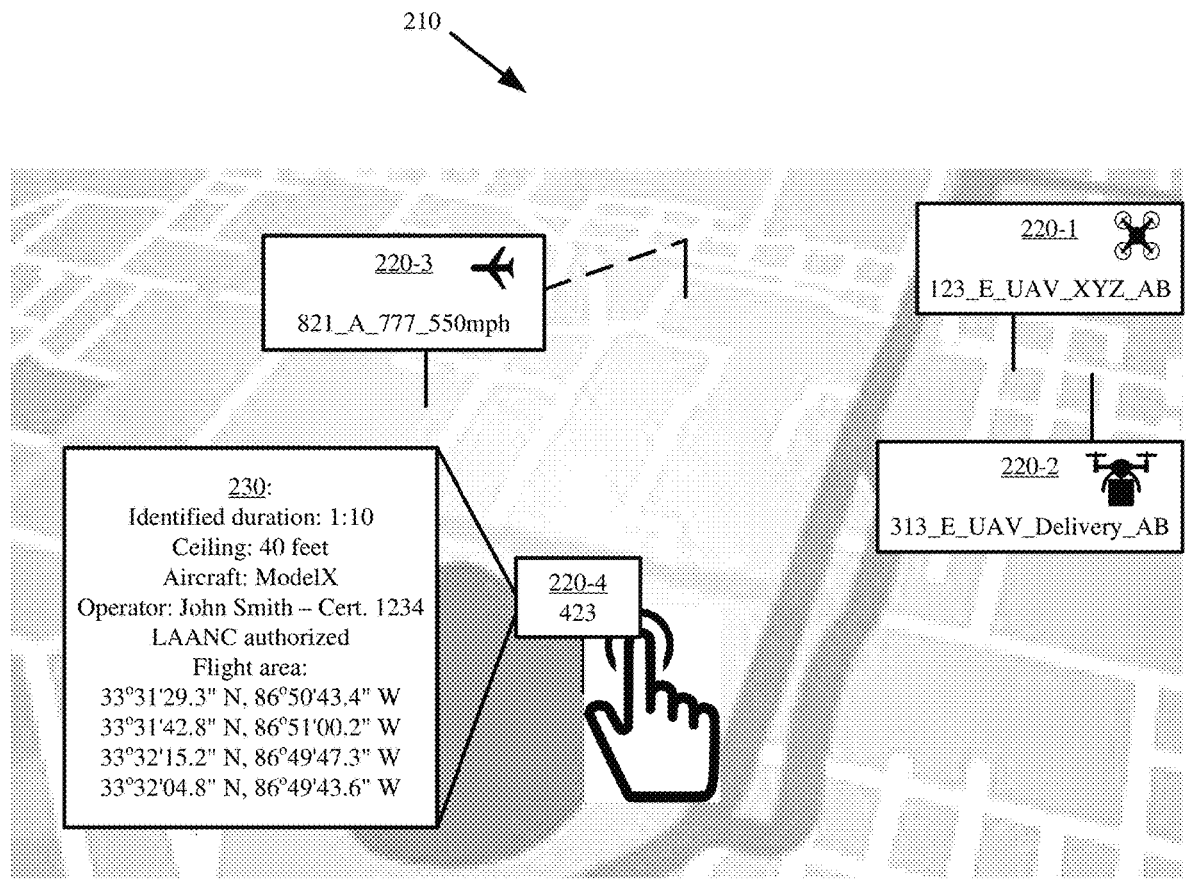
FIG. 2 illustrates an example of the aggregated information obtained by an aircraft detection device via different detection channels in accordance with some embodiments.

FIG. 2 illustrates an example of the aggregated information obtained by aircraft detection device 120 via detection channels 110 in accordance with some embodiments. FIG. 2 may include Graphical User Interface ("GUI") 210 that provides a map of some region of airspace. Aircraft detection device 120 may populate GUI 210 with identifiers 220-1, 220-2, 220-3, and 220-4 (herein sometimes collectively referred to as "identifiers 220" or individually as "identifier 220") for different aircraft that were detected via detection channels 110.

Each identifier 220 may be presented at a position corresponding to where the aircraft, identified by that identifier 220, was identified. Aircraft detection device 120 may also monitor movements of the aircraft via detection channels 110, and may reposition the corresponding identifiers 220 based on the tracked movements.

In some embodiments, each identifier 220 may provide or contain additional information about an identified aircraft. For instance, the value (e.g., sequence of alphanumeric characters) of identifier 220-1 may specify a first set of characters (e.g., "123") to uniquely differentiate the identified aircraft from other identified aircraft, a second set of characters (e.g., "E1") to identify the altitude or expected altitude range for the identified aircraft, a third set of characters (e.g., "UAV_XYZ") to identify the category, class, type, make, and/or manufacturer of the identified aircraft, and a fourth set of characters (e.g., "AB") to identify one or more detection channels 110 used to identify the aircraft.

Other identifiers 220 may include more, less, or different identifying data about the aircraft, flight, flight operator, purpose, etc. based on the data that can be obtained from the detection channel 110 used to identify the aircraft. For instance, identifier 220-2 may identify aircraft that is operated by a particular package delivery company. Some identifiers 220 may provide an icon of the identified aircraft type or may provide an exact image of the aircraft if obtained via imaging from fourth detection channel 110-4 or data from other detection channels 110.

Different detection channels 110 may provide different additional identifying data about identified aircraft. For instance, flight altitude may be estimated from fourth and fifth detection channels 110-4 and 110-5, whereas first and second detection channels 110-1 and 110-2 may provide detailed information about the aircraft as well as exact altitude, speed, trajectory, and/or other flight parameters.

In some embodiments, identifiers 220 may not be encoded with the additional information. Instead, identifiers 220 may link to the additional identifying information about the aircraft or flight. For example, when a user selects or otherwise interacts with identifier 220-4, GUI 210 may present additional identifying information 230 about the aircraft and/or flight gathered via detection channels 110.

In some embodiments, the aggregated information of identified aircraft, aircraft positioning, and/or other identifying information about the identified aircraft, flights, operators, purposes, etc. may be provided via an Application Programming Interface ("API") or may be accessed programmatically. For instance, an application may query aircraft detection device 120 for aircraft in a particular region of airspace represented by GUI 210, and aircraft detection device 120 may return identifiers 220 and/or positioning information associated with each identifier 220. The application may then query aircraft detection device 120 using identifier 220-4 in order to receive a data structure that is populated with additional identifying information 230.

Figure 3:
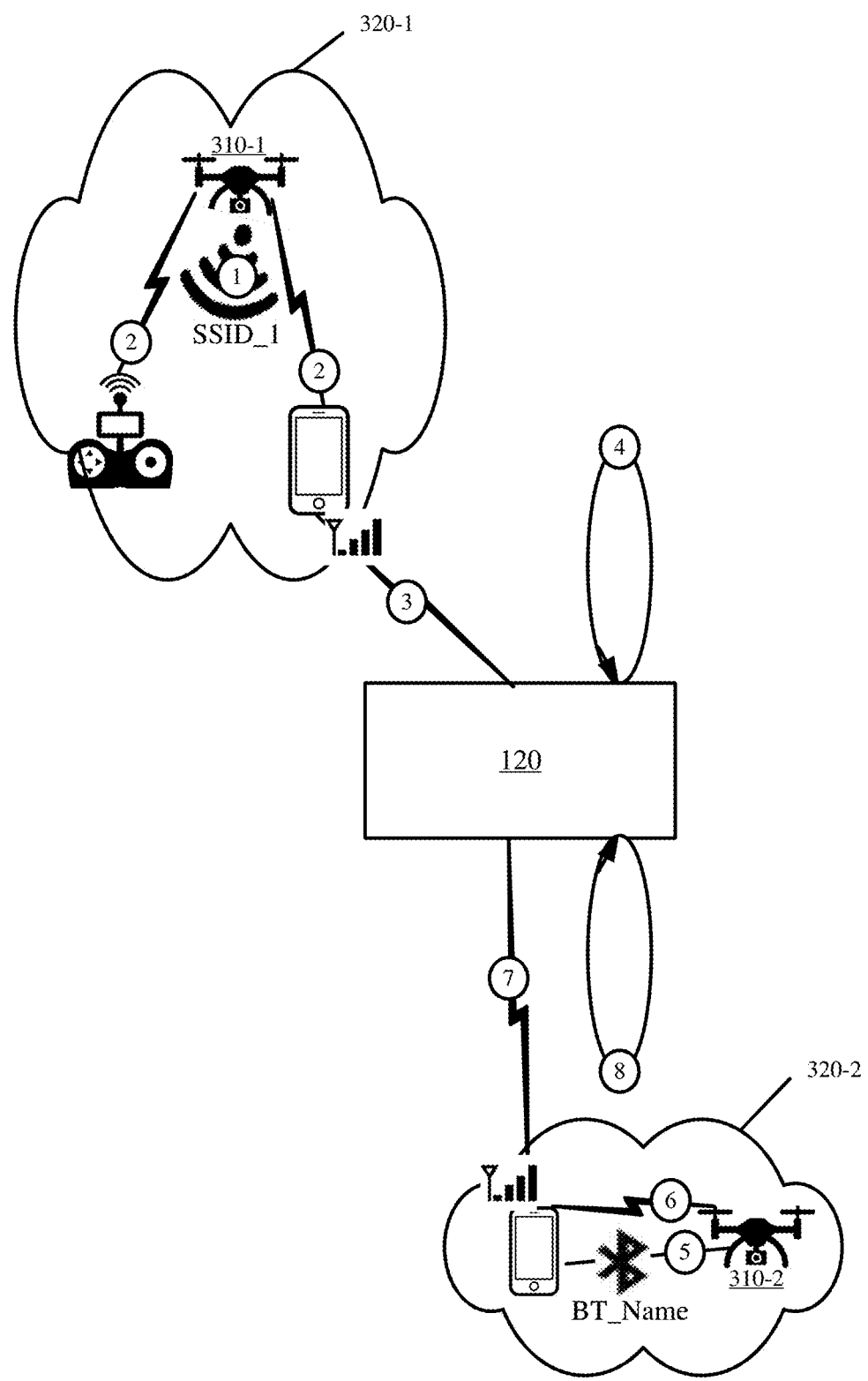
FIG. 3 illustrates an example of multi-channel remote identification of aircraft via a first detection channel in accordance with some embodiments described herein.

FIG. 3 illustrates an example of multi-channel remote identification of aircraft via first detection channel 110-1 in accordance with some embodiments described herein. FIG. 3 includes aircraft detection device 120, first aircraft 310-1, second aircraft 310-2, first network 320-1, and second network 320-2. First aircraft 310-1 and second aircraft 310-2 are herein sometimes collectively referred to as "aircraft 310" or individually as "aircraft 310". First network 320-1 and second network 320-2 are herein sometimes collectively referred to as "networks 320" or individually as "network 320".

In FIG. 3, first aircraft 310-1 communicates and/or is controlled via messaging exchanged over a WiFi network that corresponds to first network 320-1. First aircraft 310-1 may create first network 320-1 in order to communicate with a controller that is within WiFi range of first aircraft 310-1.

To create first network 320-1, first aircraft 310-1 may broadcast (at 1) a particular Service Set Identifier ("SSID") that identifies first network 320-1 and/or first aircraft 310-1 to nearby WiFi-enabled devices that are within WiFi signaling range of first aircraft 310-1. In FIG. 3, the controller that is used to control first aircraft 310-1 and/or another WiFi-enabled device that is in range of first network 320-1 may detect the particular SSID.

Each SSID receiving device may connect (at 2) to first aircraft 310-1 using first network 320-1, and may exchange one or more messages with first aircraft 310-1 in order to identify first aircraft 310-1, obtain additional identifying information about first aircraft 310-1, and/or control first aircraft 310-1. Alternatively, the SSID receiving device may identify first aircraft 310-1 and/or other identifying information directly from the formatting or contents of the particular SSID. For instance, the SSID may be formatted to differentiate first aircraft 310-1 from other WiFi networks, and/or various properties of first aircraft 310-1 (e.g., make, model, airspace class, etc.).

In some embodiments, devices may detect first aircraft 310-1 via other signaling transmitted by first aircraft 310-1. For instance, the devices may identify first aircraft 310-1 based on specific radio frequencies, messages of standard or proprietary network protocols, signaling characteristics, and/or other communication methods used by first aircraft 310-1 or a by a particular type of aircraft to communicate via first network 310-1.

One or more devices that detect first aircraft 310-1 may provide (at 3) identifying data about identified first aircraft 310-1 to aircraft detection device 120 via a cellular network or other long-range network. The detecting devices may also provide (at 3) geographic coordinates to identify a position of first aircraft 310-1. For instance, a detecting device may use a Global Positioning System (GPS) module of first aircraft 310-1 or of the detecting device to obtain geolocational or geopositional coordinates, and may provide the coordinates along with the identifying information to aircraft detection device 120. The detecting device may also track movements of first aircraft 310-1 based on the GPS module on first aircraft 310-1 (e.g., when connected to and/or controlling first aircraft 310-1) or based on changes to the signal strength of first network 320-1 as first aircraft 310-1 flies closer to or further away from the detecting device.

In response to receiving (at 3) the identifying information for first aircraft 310-1, aircraft detection device 120 may assign (at 4) an identifier to identify first aircraft 310-1. Aircraft detection device 120 may map the identifier to a corresponding position where first aircraft 310-1 or first network 320-1 is detected.

Second aircraft 310-2 may not communicate via first network 320-1 or may be outside the range of first network 320-1. In some embodiments, second aircraft 310-2 may communicate and/or may be controlled via messaging exchanged over a second network 320-2 (e.g., a Bluetooth network or a different WiFi network) that is different than first network 320-1. In some embodiments, second aircraft 310-2 may communicate using frequencies, communication protocols, signaling, and/or other communication methods that differentiate second network 320-2 from first network 320-1.

As shown in FIG. 3, second aircraft 310-2 may create second network 320-2, and may broadcast (at 5) a name or identifier with which a Bluetooth-enabled device that is in Bluetooth range of second aircraft 310-2 may use to connect to second aircraft 310-2. A nearby device may receive the broadcast name or identifier, or may detect specific messages or frequencies transmitted over second network 320-2 that identify second aircraft 310-2.

The device may connect (at 6) to second aircraft 310-2, and may exchange one or more messages with second aircraft 310-2 in order to identify second aircraft 310-2, obtain additional identifying information about second aircraft 310-2, and/or control second aircraft 310-2. The device may alternatively identify second aircraft 320-2, without connecting to second aircraft 320-2, based on the broadcast name or identifier, frequencies, signaling characteristics, network protocols, or other communication methods of second network 320-2.

The device may transmit (at 7) identifying information about second aircraft 310-2 to aircraft detection device 120. In some embodiments, the identifying information may indicate the presence of aircraft and a position of the detecting device. In some other embodiments, the identifying information may provide more detailed information about second aircraft 310-2 (e.g., category, class, type, etc.), flight parameters, information about the flight operator, flight purposes, and/or information used to identify and/or track second aircraft 310-2.

In response to receiving (at 7) the identifying information for second aircraft 310-2, aircraft detection device 120 may determine if the identifying information and positional information matches to any previously identified aircraft. In other words, aircraft detection device 120 may determine if the identifying information identifies a common aircraft that was previously identified via identifying information provided by another device or a different detection channel 110. Aircraft detection device 120 may determine that the identifying information is for newly identified aircraft (e.g., different aircraft than first aircraft 310-1) when the identifying information differentiates from other identified aircraft, or a position at which other aircraft have not been identified. In response to determining that second aircraft 310-2 was not previously identified, aircraft detection device 120 may assign (at 8) a different second identifier to differentiate second aircraft 310-2 from first aircraft 310-1 and other identified aircraft, and may map the second identifier to a corresponding position where second aircraft 310-2 or second network 320-2 is detected.

First communication channel 110-1, and specifically the different wireless networks, frequencies, protocols, signaling characteristics, and/or other communication methods of first communication channel 110-1, allow aircraft detection device 120 to identify first aircraft 310-1 and second aircraft 310-2 even when the different aircraft 310 communicate using different network technologies. Moreover, first communication channel 110-1 allows aircraft detection device 120 to identify first aircraft 310-1 and second aircraft 310-2 using any device with a wireless radio that is within range of the signaling transmitted by the aircraft 310 regardless of whether the identifying device is a controller of the aircraft or a mobile device of a user that is within wireless range of aircraft 310.

In some embodiments, first communication channel 110-1 may include other wireless networks that can be used to identify aircraft 310 in addition to or instead of the WiFi and Bluetooth networks illustrated in FIG. 3 as first network 320-1 and second network 320-2 respectively. For instance, first communication channel 110-1 may include one or more of Third Generation ("3G"), Fourth Generation ("4G"), Long Term Evolution ("LTE"), Fifth Generation ("5G"), and/or other cellular networks. Similarly, aircraft 310 may be detected based on the different frequencies, network protocols, messaging, signaling characteristics, and/or communication methods that the aircraft 310 use to communicate over these and other wireless networks.

In some embodiments, aircraft detection device 120 may identify aircraft via one or more cellular networks based on the aircraft and/or aircraft controllers registering with the cellular network through a RAN of the cellular network for network access. For instance, when aircraft register with the cellular network, the cellular network may identify the registrant to be aircraft (e.g., device type), and may provide the registration information to aircraft detection device 120.

In some embodiments, aircraft detection device 120 may identify aircraft based on messaging communicated from or to the aircraft over the cellular networks. For instance, aircraft detection device 120 may obtain a feed from different RANs or gateways of the network that filter and provide aircraft detection device 120 with the messaging communicated from or to the aircraft. The messaging can be identified based on specific port numbers, IP addresses, Media Access Control ("MAC") addresses, domain names, Uniform Resource Locators ("URLs"), and/or other identifiers. For instance, aircraft detection device 120 may utilize Multi-Access Edge Compute ("MEC") resources of a telecommunications network to identify the desired messaging. Alternatively, aircraft detection device 120 may obtain the messaging from different aircraft control cloud systems that the aircraft or aircraft controllers communicate with via the cellular networks.

As noted above, one of the advantages of the multi-channel remote identification (e.g., identifying aircraft via the different wireless networks of first detection channel 110 and via other detection channels 110) is the ability to rapidly identify aircraft via whichever detection channel first identifies the aircraft. Accordingly, aircraft detection system 100 is not limited to waiting for aircraft to satisfy the criteria of a single detection channel 110 before that aircraft can be identified. The faster identification of aircraft provided by the multi-channel remote identification can thereby increase safety and reduce airspace conflict by providing an accurate account of aircraft in airspace without unnecessary delay associated with aircraft satisfying criteria of a single detection channel before they are identified.

Figure 4:
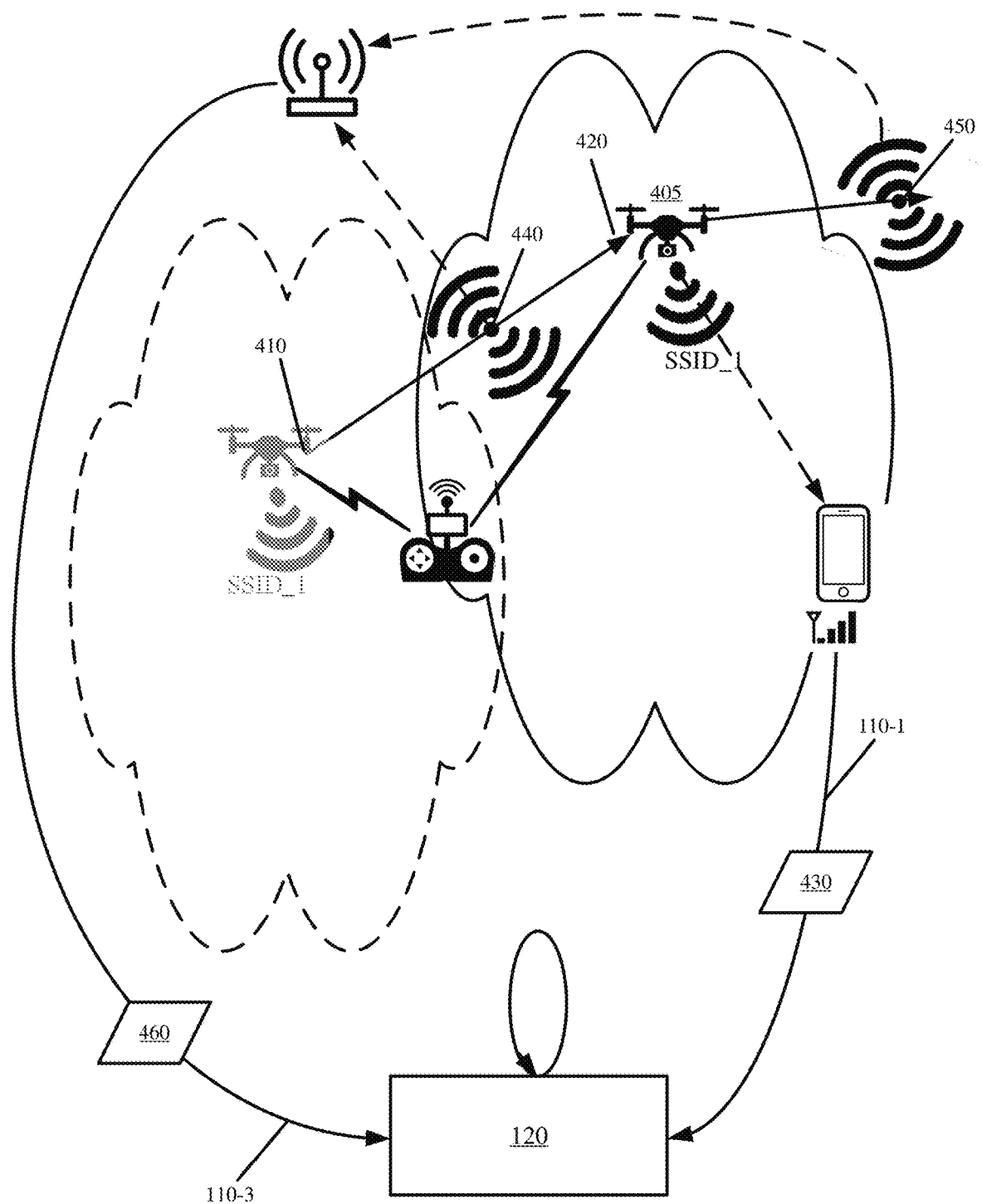
FIG. 4 illustrates an example of using different detection channels to accelerate the identification of aircraft in accordance with some embodiments described herein.

FIG. 4 illustrates an example of using different detection channels 110 to accelerate the identification of aircraft 405 in accordance with some embodiments described herein. In particular, FIG. 4 illustrates aircraft detection device 120 identifying aircraft 405 based on whichever of first detection channel 110-1 or third detection channel 110-3 first provides identifying data about aircraft 405.

Each detection channel 110 may be associated with a different delay or latency. The different delay or latency may be the result of different detection channels 110 identifying aircraft 405 at different times based on aircraft 405 satisfying the identification criteria of the different detection channels 110 at different times.

For instance, and as shown in FIG. 4, aircraft 405 may create a WiFi network at first position 410 to communicate with a controller. However, aircraft detection device 120 may not identify aircraft 405 at first position 410 via first detection channel 110-1 because the controller cannot (e.g., lacks cellular network connectivity) or may not be configured to provide identifying information to aircraft detection device 120, and no other aircraft identification devices may be in range. The WiFi network created by aircraft 405 may not be detected until a second time when aircraft 405 flies to second position 420. At second position 420, another device may be in range of the WiFi network created by aircraft 405, may identify aircraft via the WiFi network created by aircraft 405, and may provide first set of identifying information 430 about aircraft 405 to aircraft detection device 120. Accordingly, first detection channel 110-1 may identify aircraft 405 with a first delay or latency associated with receiving first set of identifying information 430.

Identifying aircraft 405 via third detection channel 110-3 may incur different second delay or latency based on when aircraft 405 broadcasts a message (e.g., an ADS-B message) associated with third detection channel 110-3 or when the broadcast message is detected by a device that is communicably coupled to aircraft detection device 120. For instance, aircraft 405 may broadcast the identifier at positions 440 or 450 upon reaching a certain altitude or after a certain duration of flight time. The message may be broadcast using one or more radio frequencies, and may be received by a broadcast receiver that listens to those radio frequencies. In response to receiving the broadcast message, the broadcast receiver may provide second set of identifying information 460 about aircraft 405 to aircraft detection device 120.

Aircraft detection device 120 may identify aircraft 405, may assign an identifier to aircraft 405, and may notify users as to the presence and location of aircraft 405 upon whichever of first set of identifying information 430 or second set of identifying information 460 is received first. Aircraft detection device 120 may determine that the later arriving set of identifying information is directed to aircraft 405 that has already been identified based on the earlier arriving set of identifying information. Accordingly, aircraft detection device 120 may ignore or discard the later arriving set of identifying information. In some embodiments, aircraft detection device 120 may use the later arriving set of identifying information to update or supplement the previously received set of identifying information for aircraft 405. For instance, aircraft detection device 120 may notify a user about a first location of aircraft 405 based on first receiving second set of identifying information 460 via third detection channel 110-3, and may update the user as to a second location of aircraft 405 based on subsequently receiving first set of identifying information 430 via first detection channel 110-1.

In some cases, the time difference for identifying aircraft 310 using different detection channels 110 may be milliseconds up to several minutes. The delays may vary as aircraft detection device 120 may be unable to identify aircraft 310 using certain detection channels 110 until aircraft 310 flies to a certain location, comes within range of a detecting device or sensor, or satisfies other criteria of a detection channel 110. The multi-channel remote identification may negate the delay by identifying aircraft 310 based on the detection channel 110 that identifies aircraft 310 the fastest.

Figure 5:
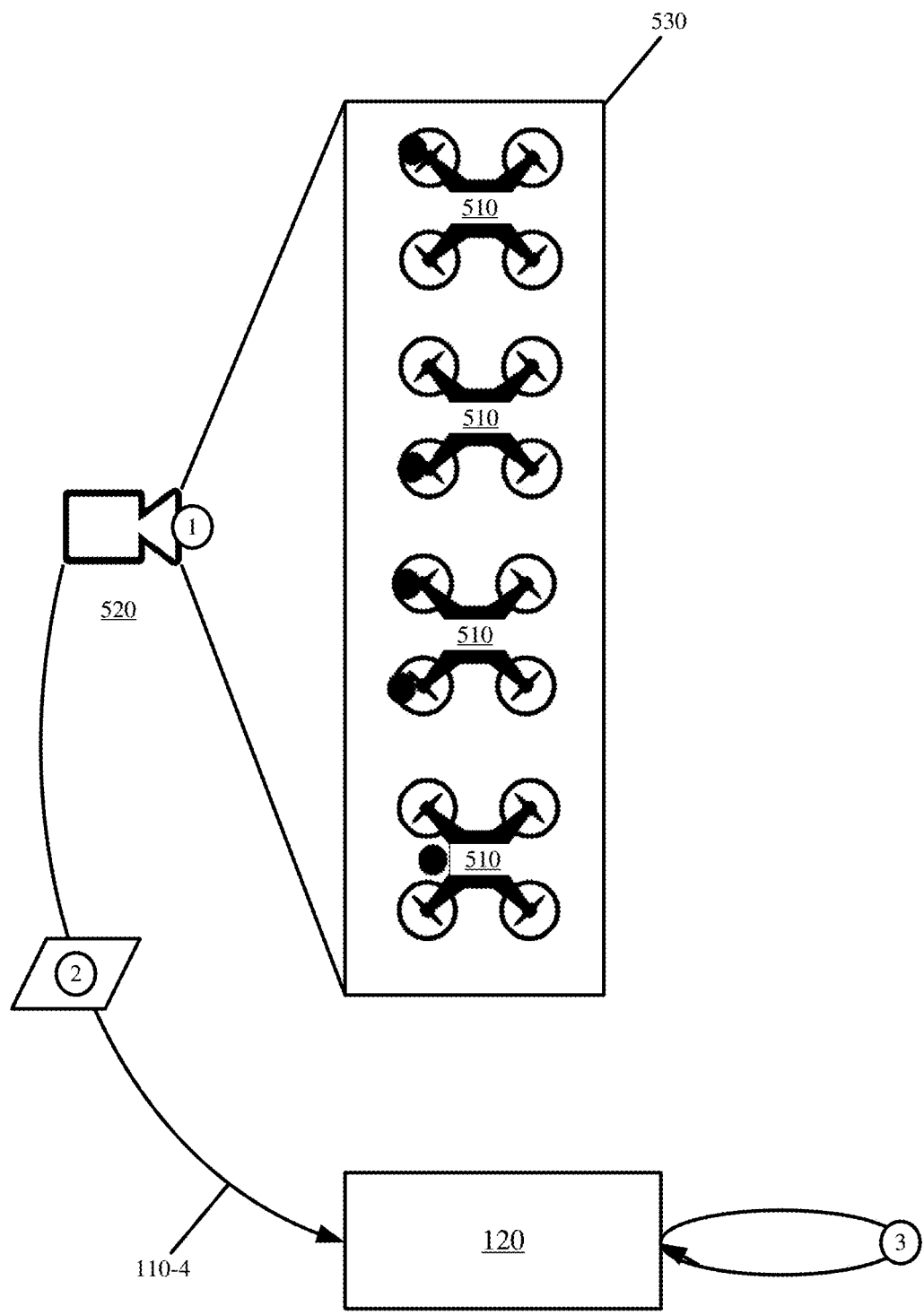
FIG. 5 illustrates an example of using a particular detection channel to identify aircraft when other detection channels may be unable to identify the aircraft or may later identify the aircraft in accordance with some embodiments.

FIG. 5 illustrates an example of using fourth detection channel 110-4 to identify aircraft 510 when other detection channels 110 may be unable to identify aircraft 510 or may identify aircraft 510 at a later time in accordance with some embodiments. For instance, aircraft 510 may fly in response to proprietary or encrypted messaging that is exchanged over a private network established between aircraft 510 and a controller. Aircraft 510 and the associated controller may lack other network connectivity such that aircraft 510 cannot be identified via any of the wireless networks of first detection channel 110-1, and cannot be detected via data relayed by the controller over second detection channel 110-2. Aircraft 510 may also lack a radio transmitter for broadcasting identifiers over a radio frequency of third detection channel 110-3, and may fly at an altitude or in airspace that is not monitored by other detection channels 110.

Aircraft detection device 120 may identify aircraft 510 using fourth detection channel 110-4 based on camera 520 that is within visual range of aircraft 510. As shown in FIG. 5, camera 520 may record (at 1) light signature 530 of aircraft 510. Light signature 530 may be defined by flashing different lights from different locations on aircraft 510, with different intensities, with different colors, for different durations, and/or in different patterns. Light signature 530 may be preferred to other visual features (e.g., shape, size, etc.) of aircraft 510 because light signature 530 may be detected from greater distances than other visual features of aircraft 510. Moreover, light signature 530 may encode an identifier that identifies aircraft 510, may encode additional identifying information, or may provide some manner of differentiating aircraft 510 from other aircraft. For instance, by flashing different lights from different locations on aircraft 510, with different intensities, with different colors, for different durations, and/or in different patterns, aircraft 510 may identify its make, model, and/or other information.

Camera 520 may provide (at 2) identifying information about aircraft 510 to aircraft detection device 120 based on light signature 530. Aircraft detection device 120 may identify aircraft 510 by decoding light signature 530 or otherwise correlating light signature 530 to aircraft 510.

Aircraft detection device 120 may assign (at 3) an identifier to aircraft 510 based on light signature 530, identifying information decoded from or otherwise obtained from light signature 530, and/or other information about aircraft 510 that is obtained by camera 520. For instance, camera 520 may capture a flight pattern of aircraft 510, an image of aircraft 510, and/or other visual features of aircraft 510 that can further aid aircraft detection device 120 in the identification of aircraft 510.

Camera 520 may be part of a device or sensor (e.g., a smartphone, laptop computer, connected camera, etc.) with cellular or long-range network connectivity and a geolocation or geopositional sensor (e.g., a GPS module). Camera 520 may determine its position using the geolocation or geopositioning sensor, and may transmit (at 2) the positional data with light signature 530 and/or other aircraft identifying information so that aircraft detection device 120 may obtain a relative position for aircraft 510 based on the position of camera 520. In some embodiments, aircraft detection device 120 may adjust the position of aircraft 510 relative to the position of camera 520 based on a distance of aircraft 510 from camera 520 that can be computed based on the appearance of aircraft 510 in images taken by camera 520. For instance, the distance between the aircraft and the device may be computed based on the size, brightness, refraction, and/or other properties of the aircraft or light captured from the aircraft, or based on movement of the observed visual characteristics relative to the device.

In some embodiments, the same device or sensor that provides aircraft detection device 120 with aircraft identifying information via one detection channel 110, may also provide additional aircraft identifying information for the same aircraft via one or more other detection channels 110. For instance, camera 520 in FIG. 5 may be part of a user mobile device (e.g., smartphone) that also has multiple wireless network radios.

The user mobile device may obtain a first set of identifying information about aircraft 510 via fourth detection channel 110-1 using camera 520, and may obtain a different second set of identifying information about aircraft 510 via first detection channel 110-1 using the one or more wireless network radios. In particular, the user mobile device may use the wireless network radios to detect a wireless network identifier that is transmitted by aircraft 510 and that identifies aircraft 510. Additionally, the user mobile device may use the wireless network radios to connect to aircraft 510 in order to retrieve additional identifying information based on messaging exchanged with aircraft 510. The user mobile device may provide the first set of identifying information via first detection channel 110-1 and the second set of identifying information via second detection channel 110-2 to aircraft detection device 120 at the same time or at different times.

Aircraft detection device 120 may receive the first and second sets of identifying information, and may determine that the different sets of identifying information identify the same aircraft. The determination may be based on receiving the different sets of identifying information from the same device at or near the same time, and/or based on commonality in the different sets of identifying information (e.g., information about aircraft that is of similar size, flies in the same airspace, is at a common location, etc.). Accordingly, aircraft detection device 120 may generate a single identifier for aircraft 510 that is identified via two or more detection channels 110.

Figure 6:
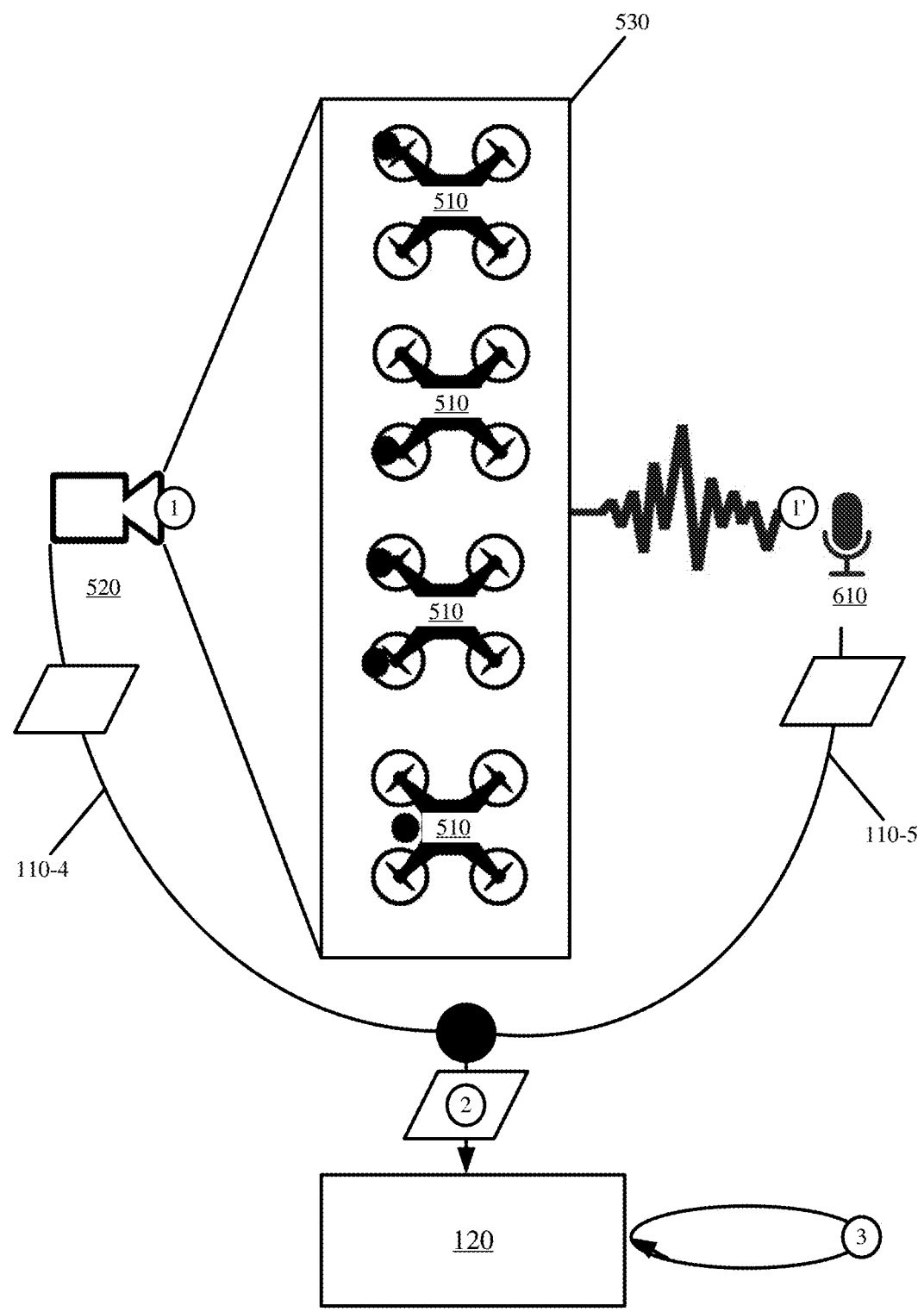
FIG. 6 illustrates an example of using different sensors to provide identifying information about aircraft via two different detection channels in accordance with some embodiments.

FIG. 6 illustrates an example of using different sensors to provide identifying information about aircraft 510 via two different detection channels 110 in accordance with some embodiments. FIG. 6 may continue from FIG. 5, and illustrates camera 520 obtaining (at 1) a first set of identifying information based on light signature 530 of aircraft 510, and microphone 610 within audible range of aircraft 510 capturing (at 1') a second set of identifying information based on the sound signature of aircraft 610. The sound signature may include sound produced by aircraft 610 during flight. Different engines of different aircraft can produce different sound signatures. In some embodiments, the aircraft may be equipped with speakers that emit ultrasonic sound or other sound to encode or otherwise transmit identifying information about the aircraft.

Camera 520 and microphone 610 may be integrated on a single device such that the first and second sets of identifying information are combined before being transmitted (at 2) to aircraft detection device 120. In some embodiments, camera 520 and microphone 610 may be part of different devices, each having cellular or long-range wireless network connectivity for separately communicating, to aircraft detection device 120, the first set of identifying information via fourth detection channel 110-4, and the second set of identifying information via fifth detection channel 110-5.

Aircraft detection device 120 may receive (at 2) the combined set of identifying information, and may identify aircraft 510 based on one or more of light signature 530 and the sound signature of aircraft 510. For instance, aircraft detection device 120 may identify aircraft 610 based on properties or characteristics of the sound. Some examples of sound properties or characteristics that may be used to identify aircraft 610 are frequency, volume, pitch, tone, and period. From these sound properties or characteristics, aircraft detection device 120 may determine the number, size, speed, and/or rotation of propellers or other engines used by aircraft 610 in order to identify aircraft 610 (e.g., aircraft 610 size, category, class, type, make, model, maximum speed, airspace class, piloted or unpiloted, etc.). As noted above, aircraft 610 may also use a speaker to generate a unique sound signature that identifies aircraft 610. In this case, the sound frequency, volume, pitch, tone, and period can be manipulated to encode aircraft identifying information. The sound may also be used to adjust the relative position of aircraft 610 as determined from the geolocation or geopositional module of the device transmitting the identifying information. Aircraft detection device 120 may assign (at 3) an identifier to aircraft 610 based on the identifying information provided via fourth detection channel 110-4 and fifth detection channel 110-5.

Figure 7:
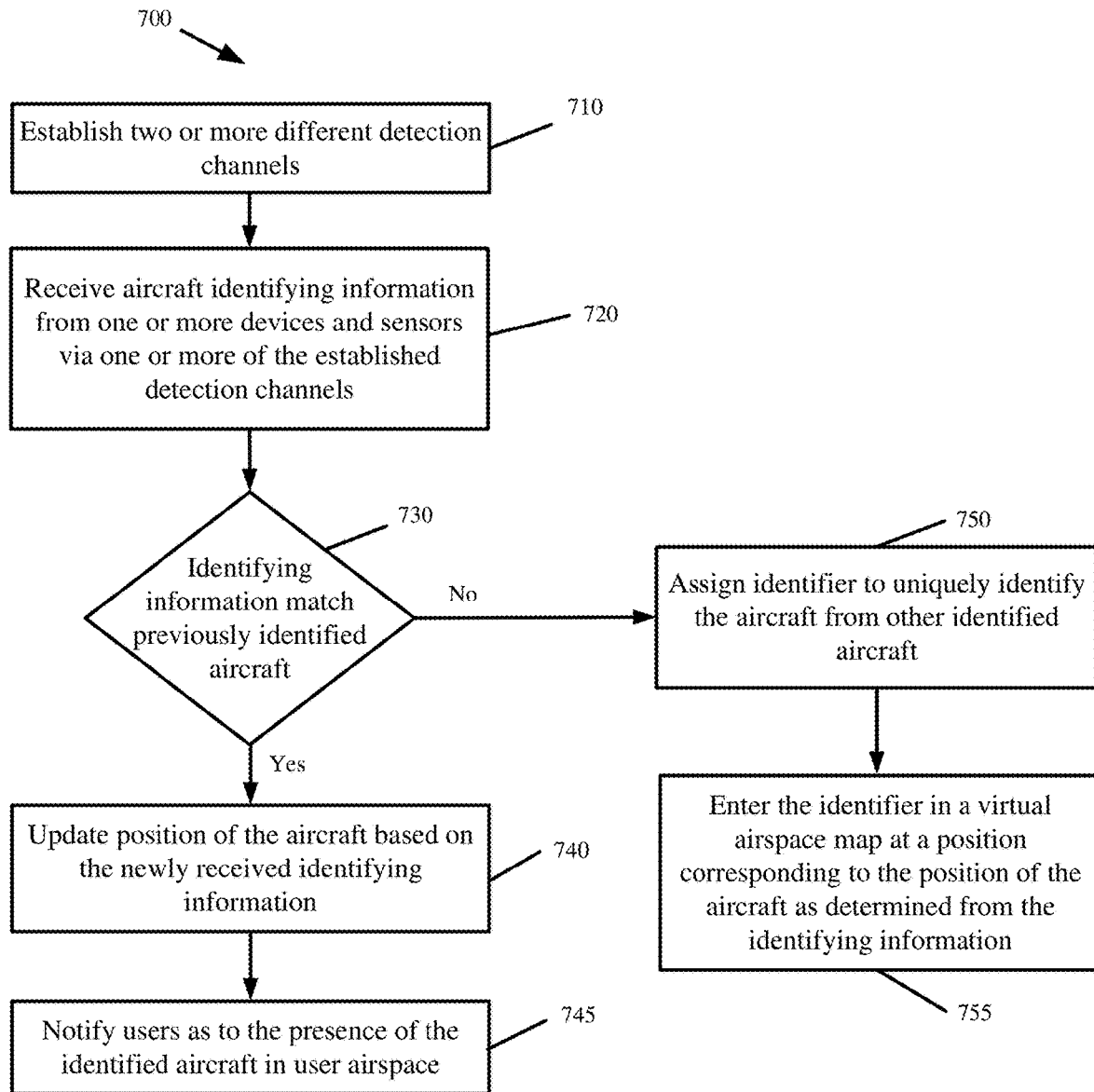
FIG. 7 presents a process for the multi-channel remote identification of aircraft in accordance with some embodiments presented herein.

FIG. 7 presents a process 700 for the multi-channel remote identification of aircraft in accordance with some embodiments presented herein. Process 700 may be performed by aircraft detection system 100 in a distributed manner by aircraft detection device 120 and a distributed set of devices and sensors.

Process 700 may include establishing (at 710) detection channels 110 for identifying different aircraft in different airspace. Establishing (at 710) detection channels 110 may include connecting aircraft detection device 120 to the distributed set of devices and sensors that operate throughout the airspace.

Process 700 may include receiving (at 720) aircraft identifying information from one or more of the distributed set of devices and sensors via one or more detection channels 110. The identifying information can include captured network messages, radio frequencies, network/wireless signaling, broadcast messages, visual features, light signatures, sound signatures, and/or sensor obtained information that is sent to or issued by aircraft. The identifying information may directly or indirectly identify aircraft. In some embodiments, the direct identification of the aircraft may include obtaining a make, model, and/or other specific information about the aircraft directly from the data obtained via the different detection channels 110. For instance, the network messages, broadcast messages, light signatures, sound signatures, etc. may encode or may otherwise provide the make, model, and/or other aircraft identifying information. In some embodiments, the indirect identification may include using the visual features, sound, network identifiers, and/or other data to determine the specifications of the aircraft. For instance, the sound may correspond to aircraft with engines or motors of a certain size, type, and/or other characteristics from which aircraft identifying information can be detected. The identifying information may further include positional information for the aircraft. As noted above, the positional information may be generated and/or obtained from a geolocation or geopositional sensor on the aircraft, may be embedded in the sensed data, or may be based on the positional information from one of the distributed set of devices or sensors that provides the identifying information about aircraft.

Process 700 may include determining (at 730) if the identifying information matches to previously identified aircraft. For instance, aircraft detection device 120 may determine if the received (at 720) identifying information is provided over different detection channels 110, and the identifying information is provided by a common device or sensor, identifies the same aircraft, and/or is related to the same position or airspace.

In response to determining (at 730—Yes) that the identifying information matches and/or identifies a previously identified aircraft, process 700 may include supplementing the identification of the aircraft with the newly received identifying information or discarding the newly received identifying information. Supplementing the identification of the aircraft may include updating (at 740) a position of the aircraft based on the newly received identifying information, and/or notifying (at 745) one or more users, that operate in the airspace around the position indicated by the identifying information, as to the presence of the identified aircraft. For instance, aircraft detection device 120 may notify the one or more users that the previously identified aircraft remains active in the airspace and/or has moved to the updated position.

In response to determining (at 730—No) that the identifying information does not match or identify a previously identified aircraft, process 700 may include assigning (at 750) a new identifier to uniquely identify the aircraft from other identified aircraft. The identifier may provide various information about the aircraft. For instance, and with reference to FIG. 2 above, the identifier may reveal the type of aircraft, the class of airspace that aircraft operates in, and/or characteristics of the aircraft, flight operator, flight plan, or flight purpose. Alternatively, aircraft detection device 120 may link the identifying information to the identifier so that the information can be graphically or programmatically accessed using the identifier.

Process 700 may include entering (at 755) the identifier in a virtual airspace map at a position corresponding to the relative or exact position of the aircraft as determined from the identifying information. The virtual airspace map may further include the identifiers for other identified aircraft. Each identifier may have a position or location in the virtual airspace map that corresponds to a last tracked or identified actual position or actual location for the aircraft identified by that identifier.

Figure 8:
FIG. 8 illustrates the airspace detection system in accordance with some embodiments described herein.

FIG. 8 illustrates airspace detection system 100 in accordance with some embodiments described herein. As shown in FIG. 8, airspace detection system 100 may include aircraft detection device 120 and a distributed set of devices and sensors that form the different detection channels 110 by which airspace detection system 110 may identify different types of aircraft 805 operating in different airspace.

Airspace detection system 100, by virtue of the multi-channel remote identification and integration of the distributed set of devices and sensors, can adapt to identify and/or track almost any kind of aerial vehicle. For instance, aircraft 805 may include different makes and models of aircraft from different manufacturers with one or more propellers, jet engines, and/or other means of flight. Aircraft 805 may include one or more sensors of the distributed set of devices and sensors. The sensors may be used to obtain various identifying information directly from aircraft 805. Aircraft 805 may further include one or more wireless radios to communicate with remote controllers, air control systems, and/or other devices.

The distributed set of devices and sensors may include user equipment ("UEs") 810, network equipment 820, broadcast receivers 830, aircraft control cloud system 840, and/or flight tracking equipment 850. Aircraft detection device 120 may be communicably coupled to each of the distributed set of devices and sensors, and may receive identifying information from each of the distributed set of devices and sensors via one or more data networks.

In some embodiments, UEs 810 may include devices that can capture and convey identifying information via first, second, third, fourth, and fifth detection channels 110. UEs 810 may include computation and communication devices, such as wireless mobile communication devices with one or more wireless network radios (operating on different frequencies or with different signaling) and/or integrated sensors such as cameras and microphones. For instance, a UE 810 may be, or may include, a radiotelephone; a personal communications system ("PCS") terminal (e.g., a device that combines a cellular radiotelephone with data processing and data communications capabilities); a personal digital assistant ("PDA") (e.g., a device that may include a radiotelephone, a pager, Internet/intranet access, etc.); a smart phone; a laptop computer; a tablet computer; a remote controller for flying aircraft 805; a camera; a sound recorder; an Internet-of-Things ("IoT") device; or another type of mobile computation and communication device. UEs 810 may be portable devices that can be carried by users for flight control or purposes unrelated to flight. Accordingly, airspace detection system 100 may leverage almost any network-enabled device to identify aircraft 805 via one or more detection channels 110.

Network equipment 820 may include base stations, routers, RANs, MEC devices, servers, and/or other devices that are distributed throughout a network and that can provide aircraft identifying information to aircraft detection devices 120 based on data packets passing through a network. Network equipment 820 may further include network components that register aircraft 805 and other devices in order to provide access to the network.

Broadcast receivers 830 may include devices that are tuned to various radio frequencies in order to receive broadcast message or identifiers from aircraft 805. Broadcast receivers 830 may be special-purposed devices that are distributed throughout airspace. Broadcast receivers 830 may also include one or more UEs 810 that have the proper radios or sensors to receive the broadcast messages.

Aircraft control cloud system 840 may include one or more cloud-based systems that track and/or control flights of a set of aircraft 805 remotely from within a network (e.g., a cellular network). Cloud-based systems may also access aircraft detection system 100 to assist users in creating a non-conflicting and authorized flight plan.

Flight tracking equipment 850 may include radar, satellite, and/or other equipment used by air traffic controllers to identify and track commercial aircraft. Flight tracking equipment 850 may be restricted to a single detection channel that is unable to detect smaller aircraft such as drones, UAVs, personal transportation aerial vehicles, etc.

Aircraft detection device 120 may be implemented and/or executed by dedicated and/or shared computing machines of airspace detection system 100. For instance, aircraft detection device 120 may be a network-enabled server that identifies and tracks aircraft 805 based on identifying information obtained from the distributed set of devices and sensors via different detection channels 110.

The quantity of devices and/or sensors, illustrated in FIG. 8, is provided for explanatory purposes only. In practice, airspace detection system 100 may include additional devices and/or sensors; fewer devices and/or sensors; different devices and/or sensors; or differently distributed devices and/or sensors than illustrated in FIG. 8. Devices and sensors of airspace detection system 100 may interconnect with each other and/or other devices via wired connections, wireless connections, or a combination of wired and wireless connections.

Figure 9:
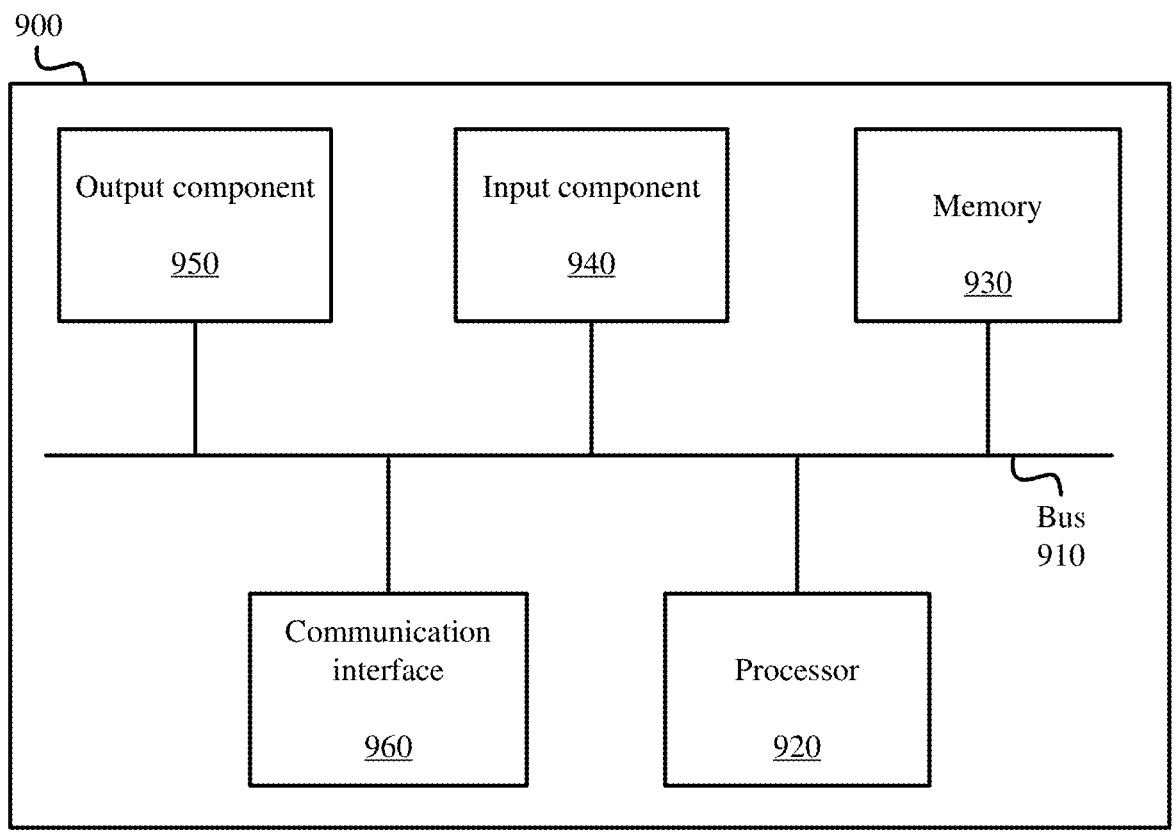
FIG. 9 illustrates example components of one or more devices, according to one or more embodiments described herein.

FIG. 9 is a diagram of example components of device 900. Device 900 may be used to implement aircraft detection device 120 and/or the distributed set of devices and sensors of aircraft detection system 100. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method comprising:
  receiving identifying information about a first set of aircraft flying over airspace via a first detection channel that uses a first set of sensors distributed throughout the airspace;
  receiving identifying information about a second set of aircraft flying over the airspace via a different second detection channel that uses a second set of sensors that are different than the first set of sensors and that are distributed throughout the airspace;
  determining a plurality of aircraft flying in the airspace based on receiving the identifying information about the first set of aircraft and receiving the identifying information about the second set of aircraft;
  assigning an identifier that differentiates each aircraft of the plurality of aircraft from other aircraft of the plurality of aircraft; and
  providing the identifier for a particular aircraft of the plurality of aircraft at a position corresponding to a relative position of the particular aircraft that is determined from either the first set of sensors or the second set of sensors used to identify the particular aircraft, and different identifiers for other aircraft of the plurality of aircraft at positions corresponding to relative positions of the other aircraft that are determined from either the first set of sensors or the second sets of sensors used to identify the other aircraft.

2. The method of claim 1 further comprising:
  detecting the identifying information about the first set of aircraft based on messaging originating from two or more different wireless networks.

3. The method of claim 2 further comprising:
  obtaining a relative position for each aircraft of the first set of aircraft based on a position of a wireless network from the two or more different wireless networks used to detect the aircraft.

4. The method of claim 1 further comprising:
  detecting a common aircraft that is identified in the identifying information about the first set of aircraft and that is identified in the identifying information about the second set of aircraft; and
  wherein assigning the identifier comprises providing an identifier to the common aircraft based on whichever of the identifying information about the first set of aircraft or the identifying information about the second set of aircraft is received first.

5. The method of claim 1 further comprising:
  detecting a common aircraft that is identified in the identifying information about the first set of aircraft and that is identified in the identifying information about the second set of aircraft;
  notifying a user about flight of the common aircraft based on the identifying information about the first set of aircraft in response to receiving the identifying information about the first set of aircraft before receiving the identifying information about the second set of aircraft, wherein said notifying based on the identifying information about the first set of aircraft comprises:
    providing the user with the identifier of the common aircraft upon receiving the identifying information about the first set of aircraft; and
    discarding the identifying information for the common aircraft upon receiving the identifying information about the second set of aircraft.

6. The method of claim 5 further comprising:
  notifying the user about the flight of the common aircraft based on the identifying information about the second set of aircraft in response to receiving the identifying information about the second set of aircraft before receiving the identifying information about the first set of aircraft, wherein said notifying based on the identifying information about the second set of aircraft comprises:

providing the user with the identifier of the common aircraft upon receiving the identifying information about the second set of aircraft; and
discarding the identifying information for the common aircraft upon receiving the identifying information about the first set of aircraft.

7. The method of claim 1,
wherein the first set of aircraft comprises aircraft of a first category, class, or type that is detectable by the first set of sensors of the first detection channel and that is undetectable by the second set of sensors of the second detection channel; and
wherein the second set of aircraft comprises aircraft of a different second category, class, or type that is detectable by the second set of sensors of the second detection channel and that is undetectable by the first set of sensors of the first detection channel.

8. The method of claim 1 further comprising:
connecting to a first set of user equipment comprising the first set of sensors using a first network; and
wherein receiving the identifying information about the first set of aircraft comprises obtaining, from the first set of user equipment via the first network, the identifying information about the first set of aircraft that the first set of user equipment collects from at least one second network that is different than the first network.

9. The method of claim 1 further comprising:
connecting to a first set of user equipment comprising the first set of sensors using a first network; and
wherein receiving the identifying information about the first set of aircraft comprises obtaining, from the first set of user equipment via the first network, the identifying information about the first set of aircraft that the first set of user equipment collects based on different radio frequencies, signaling, or network protocol messaging used to communicate with the first set of aircraft.

10. The method of claim 1 further comprising:
generating the identifying information about the first set of aircraft from a network identifier that is broadcast from each aircraft of the first set of aircraft, the network identifier identifying a wireless network for controlling the aircraft.

11. The method of claim 1 further comprising:
receiving identifying information about a third set of aircraft flying over the airspace via a third detection channel that uses radar or satellite instead of the first set of sensors and the second set of sensors.

12. The method of claim 1, wherein receiving the identifying information about the first set of aircraft via the first detection channel comprises:
obtaining a light signature of each aircraft from the first set of aircraft using a camera or imaging sensor of the first set of sensors; and
classifying the first set of aircraft based on the light signature.

13. The method of claim 12, wherein receiving the identifying information about the second set of aircraft via the second detection channel comprises:
obtaining a sound signature of each aircraft from the second set of aircraft using a microphone or sound sensor of the second set of sensors; and
classifying the second set of aircraft based on the sound signature of each aircraft of the second set of aircraft.

14. A method comprising:
receiving first identifying information about a particular aircraft flying over airspace via a first detection channel that uses a first set of sensors distributed throughout the airspace;
receiving second identifying information about the particular aircraft flying over the airspace via a different second detection channel that uses a second set of sensors that are different than the first set of sensors and that are distributed throughout the airspace, wherein the first identifying information is different than the second identifying information;
notifying a user about the particular aircraft based on the first identifying information from the first set of sensors in response to receiving the first identifying information before the second identifying information; and
notifying the user about the particular aircraft based on the second identifying information from the second set of sensors in response to receiving the second identifying information before the first identifying information.

15. The method of claim 14 further comprising:
identifying the particular aircraft based on a first message issued by the particular aircraft and provided as part of the first identifying information; and
identifying the particular aircraft based on a second message issued by a controller and provided as part of the second identifying information, wherein the controller is connected to the particular aircraft and is used to control flight of the particular aircraft.

16. The method of claim 14 further comprising:
identifying the particular aircraft based on a light signature of the particular aircraft captured by the first set of sensors and provided as part of the first identifying information; and
identifying the particular aircraft based on a sound signature of the particular aircraft captured by the second set of sensors and provided as part of the second identifying information.

17. The method of claim 14, wherein the first set of sensors comprises equipment with a first network radio used in transmitting and receiving signaling via a first frequency, and wherein the second set of sensors comprises equipment with a different second network radio used in transmitted and receiving signaling via a different second frequency.

18. The method of claim 14, wherein the first set of sensors comprises at least one receiver configured to receive identifiers broadcast from aircraft during flight, and wherein the second set of sensors comprises equipment with at least one of a wireless network radio, a camera, or a microphone.

19. The method of claim 14 further comprising:
assigning an identifier that differentiates the particular aircraft from other detected aircraft in response to receiving either the first identifying information or the second identifying information first.

20. A device comprising:
a non-transitory computer-readable medium storing a set of processor-executable instructions; and
one or more processors configured to execute the set of processor-executable instructions, wherein executing the set of processor-executable instructions causes the one or more processors to:
receive identifying information about a first set of aircraft flying over airspace via a first detection channel that uses a first set of sensors distributed throughout the airspace;
receive identifying information about a second set of aircraft flying over the airspace via a different second detection channel that uses a second set of sensors that are different than the first set of sensors and that are distributed throughout the airspace;

determine a plurality of aircraft flying in the airspace based on receiving the identifying information about the first set of aircraft and receiving the identifying information about the second set of aircraft;

assign an identifier that differentiates each aircraft of the plurality of aircraft from other aircraft of the plurality of aircraft; and provide the identifier for a particular aircraft of the plurality of aircraft at a position corresponding to a relative position of the particular aircraft that is determined from either the first set of sensors or the second set of sensors used to identify the particular aircraft, and different identifiers for other aircraft of the plurality of aircraft at positions corresponding to relative positions of the other aircraft that are determined from either the first set of sensors or the second sets of sensors used to identify the other aircraft.

\* \* \* \* \*